Patented Feb. 22, 1949

2,462,782

UNITED STATES PATENT OFFICE 2,462,782

PRODUCTION OF TOTAQUINE

Jacob B. Shohan, West Orange, N. J., assignor to American Home Products Corporation, New York, N. Y., a corporation of Delaware No Drawing. Application June 6, 1945,
Serial No. 597,969

7 Claims. (Cl. 260—284)

This invention relates to a method of recovering totaquine from plant material containing cinchona alkaloids, such as cinchona bark, in which desired alkaloids are extracted from the plant material by aqueous mineral acids, and impurities are then precipitated from the acid extract by partial neutralization to a controlled acidity without substantial precipitation of the desired alkaloids. More particularly, this invention relates to such a process in which part of the impurities are precipitated and separated from the acid extract by partial neutralization to a controlled acidity, the alkaloids are then precipitated from the partially purified extract by alkali, and remaining impurities are separated from the alkaloids by filtration after resolution of the alkaloids in an aqueous medium of a controlled pH value at which remaining impurities are undissolved. An additional and optional feature of my invention is the adsorption of impurities from an acid extract of totaquine to an inorganic precipitate, such as calcium phosphate, formed in situ.

The cinchona alkaloids are customarily recovered from plant material such as cinchona bark by digestion of the finely divided material with an aqueous alkaline medium in the presence of an organic solvent. The alkaline medium is usually milk of lime with some added sodium hydroxide, and the solvent is usually a water-immiscible hydrocarbon such as a light petroleum naphtha, benzene or the like. The alkali sets free the alkaloid bases which are taken up by the solvent. The solvent layer is separated, and the alkaloids are recovered from the solvent in the form of salts by extraction of the solvent with aqueous mineral acid, usually sulfuric acid.

The acid extract may then be worked up for recovery of individual alkaloid salts, e. g. the sulfates respectively of quinine and cinchonine, or the total alkaloid mixture may be recovered in the form of mixed salts or bases for therapeutic use as totaquine.

Instead of the above-described alkali-solvent extraction, the direct extraction of cinchona alkaloids from plant material with dilute acids has been proposed and to some extent used commercially. It has the great advantage over the alkali method that the use of organic solvent is either eliminated or minimized, thus reducing processing cost and eliminating or minimizing the substantial fire and health hazards involved in using organic solvents.

The acid extraction method, however, has so far suffered from the great drawback in comparison with the alkali method that the acid extraction step removes from the vegetable raw material relatively large amounts of inorganic impurities and of colored, gummy organic impurities which are not extracted by alkali, or, if extracted, are not taken up by the solvent. Accordingly, the raw alkaloids recovered by the alkali-solvent method are easy to purify to meet pharmaceutical requirements, while the acid-extracted cinchona alkaloids are more difficult to purify by any method which is at the same time cheap, simple and effective. By "inorganic impurities" I mean to include all such contaminants as leave an ash on ignition, although from the point of view of pure chemistry some or all of them may be salts of organic acids or other metal-organic compounds.

It is one object of this invention to provide a cheap and effective method for recovering cinchona alkaloids.

It is another object of this invention to provide a method of this sort which obviates the use of organic solvents.

It is another object of this invention to provide a method of this sort which is particularly adapted to recover totaquine.

It is a further object of this invention to provide cheap and effective methods of purifying acid-extracted cinchona alkaloids.

Another object of my invention is to provide a method of extracting cinchona alkaloids which may be carried out in the field with simple equipment.

Other objects and advantages will be apparent to those skilled in the art, from the following description.

According to my invention I extract cinchona-alkaloid-containing vegetable material, such as cinchona bark, with dilute aqueous mineral acid. The bark is preferably ground or otherwise comminuted before extraction. Sulfuric acid is the preferred extracting agent, but other acids, such as hydrochloric and phosphoric acids, can be used. It is advantageous to carry out the extraction in a countercurrent stepwise manner so that fresh acid is used to extract nearly exhausted bark and acid nearly saturated with alkaloid is brought into contact with unextracted bark. This utilizes the acid efficiently and reduces the amount of alkali needed in subsequent steps. The acid extractant may be heated during extraction, but heating is not necessary.

The acid extract thus prepared contains the desired alkaloid salts in solution and also contains in true and colloidal solution and in suspension considerable amounts of inorganic impurities and of colored, gummy organic impurities. The color of the solution may be dark brown to yellow, and the reaction is distinctly acid, say about pH 4 or less. I have discovered that if such a solution is cautiously neutralized to a pH not above about 7 by the addition of alkali such as a sodium carbonate solution, a point may be reached at which all, or the major part of, the impurities are precipitated as a dark violet sticky solid. The dissolved impurities aid in determining the end point of this neutralization since they include a natural indicator which turns from brownish yellow to violet at about pH 7.

The precipitate is removed from the extract by filtration, centrifuging or decanting, and is discarded after washing. If the neutralization is carefully carried out, the washed precipitate contains little or no alkaloid. The lower the pH at which the precipitation is effected, the less risk there is of losing alkaloids in the precipitate, but the less effective also is the removal of impurities from solution.

The filtrate is made alkaline, e. g. with sodium carbonate solution, and brought to a pH of approximately 8. This causes the precipitation of substantially all the alkaloids present in the solution in the form of their insoluble bases. The product thus obtained has been freed of the major part of the impurities originally present, but usually still has too high an ash content to meet U. S. P. specifications. After washing, the precipitate consists of a wet heavy mass which may contain in the neighborhood of 20 percent solids. It is treated with 50 percent sulfuric acid, and hot water is added; the pH is then cautiously adjusted by the addition of sodium carbonate solution to a value between 6 and 7 at which substantially all of the desired alkaloids are again brought into solution in the form of salts, while a residue of difficultly soluble salts and some coloring matter remains undissolved. The residue is separated from the solution by filtration or otherwise and a filtrate is obtained containing the desired alkaloids in solution as salts. They can then be directly precipitated by the addition of alkali, and recovered by filtration; or by a slight shift of the acidity towards the alkaline side, near to but never above about pH 7, a small additional amount of oily or sticky material can sometimes be precipitated and removed by filtration before the final precipitation of the totaquine.

Instead of sodium carbonate, other alkaline materials may be used in the above-described precipitations—e. g., potassium carbonate, sodium hydroxide, potassium hydroxide, ammonia or the like.

Totaquine so produced will vary in color from buff to gray, and be sufficiently low in ash to meet U. S. P. requirements.

If a specially pure grade of totaquine is desired, it may be obtained in the following way. Partially purified totaquine precipitated from an acid extract by one of the methods described above is heated in dilute phosphoric acid solution to give a turbid solution in which a brown flocculent precipitate is suspended. A thin suspension of calcium hydroxide is added to bring the pH of the solution to about 7. A precipitate of calcium phosphate is thus formed which not only carries down the flocculent suspended matter and aids in its filtration; but to which a substantial amount of the dissolved impurities are adsorbed when the pH is brought to about 7.

After filtration of the hot solution, the alkaloids are precipitated by alkali in the usual way from the filtrate, washed with water, and dried. A good grade of commercial totaquine is thus obtained.

As stated above, the initial extraction of the bark may be carried out hot or cold, but cold extraction is satisfactory and is usually more convenient to carry out in the field since considerable volumes of liquid are involved. Subsequent resolutions and filtrations in the purification of crude totaquine are preferably carried out at or near the boiling temperature; the volumes of liquid involved being smaller, this offers no great difficulty in field work.

In view of the quantitative and qualitative variations in the composition of commercial cinchona barks and the impracticability of close control of all the conditions in actual operations, it is not possible to define precisely the optimum pH for each step. Tests in a small scale must be run from time to time. However, with the aid of such tests the operator will readily recognize the proper end points within the pH ranges herein set forth.

An unexpected feature of the above described work was that by working with these cinchona-alkaloid-containing materials and manipulating them alternately from acidic to basic and basic to acidic reactions in a narrow range of pH value, that is approximately from just below pH 7 to about pH 8, it was possible with intermediate filtration to effect sufficiently complete separation of impurities from the alkaloids so that the alkaloids met U. S. P. totaquine requirements, and, while doing this, to recover a satisfactory percentage of the alkaloids present in the bark. It will thus be seen that my invention furnishes a simple, economical and effective method, adapted for use in the field, of recovering cinchona alkaloids from vegetable materials containing such alkaloids without the use of organic solvents and without the necessity of using complicated or bulky equipment.

Specific examples of the application of my invention follow.

*Example 1*

10 pounds of pulverized cinchona bark is stirred into approximately 45 pounds of 10 percent sulfuric acid; after complete wetting of the bark the mixture is allowed to steep for 2 to 6 hours, or, if convenient, over night. Apppproximately ½ to ⅔ of the liquid is then withdrawn from the slurry by filtration, and an equivalent amount of water added to the wet residue. The first extract, its acid content having been reduced to about 8%, is then used for wetting out and extracting an additional amount of pulverized bark equal to that first used. In order to make a tractable slurry, wash water from the first batch is added to this second batch, further bringing down the concentration of acid and making up the weight of first extract and washings to about 45 pounds. The extract and washings from the second batch are used to extract additional bark. Extractions are continued in this way in series until the acid initially present is gradually reduced to a pH of about 4. Successive batches of bark are advanced through this series of extractions in such a way that fresh unextracted bark is treated with nearly saturated acid extract, the bark entering and the acid extract leaving the series at this step; and nearly exhausted bark is contacted with fresh 10 percent acid, the bark leaving and the acid entering the extraction at this step. Water may be added where necessary to maintain a ratio of about 45 pounds of liquid to 10 pounds of bark.

The nearly saturated dilute sulfuric acid extract produced by this series of extractions and having a pH of approximately 4 is a brown to brownish yellow solution. Its pH is determined by "Hydrion" (Universal) test paper.

Sodium carbonate solution of 15 percent is then slowly added with stirring to the acid extract until the pH is brought to a point, approximately 7, at which a change in color of the liquid from brownish yellow to violet occurs, and precipitation of a dark violet sticky solid occurs without substantial precipitation of alkaloids. The sticky solid precipitate is filtered off on a suction filter and washed with water to free it of mother liquor. The precipitate is then discarded.

The combined filtrate and washings are then brought to a pH of 8 by the addition with stirring of a further amount of 15 percent sodium carbonate. The precipitate so produced contains substantially all of the desired alkaloids freed from the major part of the contaminating impurities originally present. This precipitate is a wet dark-gray colored mass containing in the neighborhood of 20 percent solids. The solids have an ash content too high to meet U. S. P. requirements. This wet mass is slurried with sufficient hot water to make a thick suspension, and a small amount of 50% sulfuric acid is added with agitation, the amount being controlled to lower the pH of the liquid to just below 7 as determined by "Hydrion" (Universal) test paper. This brings substantially all the desired alkaloids into solution but leaves undissolved difficulty soluble salts and a small amount of colored material. This mixture is filtered hot; the filtrate is boiled with decolorizing carbon (7-10 grams "Darco" No. 60 per liter), and again filtered. A filter aid ("Filter-cel," 10-15 grams per liter) is advantageously added prior to one or both of these filtrations. The final filtrate is a clear light yellow solution. It is cooled and totaquine is precipitated from the filtrate by the addition of 15% sodium carbonate to a pH of about 8. After standing an hour, the precipitate is filtered, washed and dried. The cream colored product is of good commercial purity, and has an ash content of about 1.2%—well below U. S. P. requirements.

*Example 2*

A totaquine precipitate partially purified by fractional precipitation from an acid extract as described in Example 1 and having a solids content of about 50 percent is heated with approximately six times its weight of 6 percent phosphoric acid. The resultant solution is turbid, and a brown flocculent precipitate remains in suspension.

A thin suspension of calcium hydroxide is added to the mixture in amount sufficient to bring the pH up to approximately 7 as determined by "Hydrion" (Universal) test paper. This causes a heavy precipitation of calcium phosphate in the solution, to which is absorbed a substantial amount of the remaining impurities present. On filtration without the addition of activated carbon, a clear yellow solution is obtained. This is further neutralized with sodium carbonate, the precipitated alkaloids filtered off, washed with water, and dried. The resultant material is a totaquine light tan in color and containing only 1 percent ash.

I claim:

1. In a process for recovering purified cinchona alkaloids by acid extraction of vegetable material containing such alkaloids, the steps which comprise: partially neutralizing an acid solution of cinchona alkaloids containing also acid-extractable impurities by adding sufficient alkali to selectively precipitate at least a portion of said impurities but insufficient to precipitate a major amount of the alkaloids present, removing the precipitated impurities from the mother liquor, and thereafter recovering alkaloids from the mother liquor.

2. In a process for recovering purified cinchona alkaloids by acid extraction of vegetable material containing such alkaloids, the steps which comprise: adding to a mineral-acid solution of cinchona alkaloids containing also acid-extractable impurities an alkaline material in amount to reduce the acidity of the solution to about pH 7, thereby selectively precipitating a major portion of the dissolved impurities without substantial precipitation of the desired alkaloids, separating the resultant precipitate from the mother liquor, thereafter adding additional alkaline material to the mother liquor in amount sufficient to bring its alkalinity to at least pH 8, thereby precipitating desired alkaloids in at least partially purified form, and recovering the precipitated alkaloids.

3. In a process for recovering purified cinchona alkaloids by acid extraction of vegetable material containing such alkaloids, the steps which comprise: adding to a mineral-acid solution of cinchona alkaloids containing also acid-extractable impurities an alkaline material in amount to reduce the acidity of the solution to about pH 7, thereby selectively precipitating a major portion of the dissolved impurities without substantial precipitation of the desired alkaloids, separating the resultant precipitate from the mother liquor, thereafter adding additional alkaline material to the mother liquor in amount sufficient to bring its alkalinity to at least pH 8, thereby precipitating desired alkaloids, reslurrying the precipitate with water to form a tractable slurry, adding mineral acid to the slurry in controlled amount to bring the acidity of the slurry to about pH 7, thereby selectively dissolving the desired alkaloids, separating undissolved impurities from the solution, and thereafter recovering alkaloids from the solution.

4. In a process for recovering purified cinchona alkaloids by acid extraction of vegetable material containing such alkaloids, the steps which comprise: partially neutralizing an acid solution of cinchona alkaloids containing also acid-extractable impurities by adding sufficient alkali to selectively precipitate at least a portion of said impurities but insufficient to precipitate a major portion of the alkaloids present, removing the precipitated impurities from the mother liquor, then adding sufficient alkali to the mother liquor to precipitate partially purified alkaloids, separating the precipitated alkaloids from the second mother liquor so formed, redissolving the precipitated alkaloids in dilute phosphoric acid, adding calcium hydroxide to the resultant acid solution to a pH not above 7 to form a precipitate of calcium phosphate and adsorbed impurities, separating the precipitate from the third mother liquor so formed, and recovering purified alkaloids from this mother liquor.

5. The method of recovering totaquine, which comprises extracting plant material containing cinchona alkaloids with an aqueous mineral acid, precipitating acid-extracted impurities by partial neutralization to a pH not above 7, removing the separated impurities, and recovering totaquine from the resultant solution.

6. The method of recovering totaquine, which comprises extracting plant material containing cinchona alkaloids with dilute aqueous sulfuric acid, adding to the acid extract sufficient alkali to selectively precipitate acid-extracted impurities but insufficient to raise the pH above 7, removing the precipitated impurities, adding a soluble alkali to the resultant solution to a pH of about 8 thereby forming a precipitate consisting of a major fraction of alkaloids and a minor fraction of residual acid-extractable impurities, separating the precipitate, redissolving the precipitate in a limited amount of dilute sulfuric acid sufficient to selectively dissolve substantially all of the alkaloids while leaving at least a part of the impurities undissolved, separating the undissolved impurities, and recovering totaquine from the resultant solution.

7. The method defined in claim 6, in which partially extracted plant material is further extracted with fresh dilute sulfuric acid and unextracted plant material is extracted with dilute sulfuric acid partially saturated with cinchona alkaloids.

JACOB B. SHOHAN.

REFERENCES CITED

The following references are of record in the file of this patent:

UNITED STATES PATENTS

| Number | Name | Date |
| --- | --- | --- |
| 378,233 | Casamajor | Feb. 21, 1888 |